United States Patent
Kotanides, Jr.

(10) Patent No.: US 7,267,149 B2
(45) Date of Patent: Sep. 11, 2007

(54) PNEUMATIC TIRE WITH IMPROVED CROWN DURABILITY

(75) Inventor: John Kotanides, Jr., Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 485 days.

(21) Appl. No.: 10/744,984

(22) Filed: Dec. 22, 2003

(65) Prior Publication Data

US 2005/0133138 A1 Jun. 23, 2005

(51) Int. Cl.
*B60C 9/20* (2006.01)
*B60C 9/18* (2006.01)
*B60C 9/28* (2006.01)

(52) U.S. Cl. ........................ 152/527; 152/526; 152/538
(58) Field of Classification Search ................ 152/526, 152/527, 538
See application file for complete search history.

(56) References Cited

U.S. PATENT DOCUMENTS

| | | | |
|---|---|---|---|
| 3,682,222 A | 8/1972 | Alderfer | |
| 3,780,782 A | 12/1973 | Jennings et al. | |
| 3,990,493 A | 11/1976 | Caretta | |
| 4,928,742 A | 5/1990 | Oku et al. | |
| 5,042,546 A | 8/1991 | Forney et al. | |
| 5,201,969 A * | 4/1993 | Nishi et al. | 152/527 |
| 5,332,017 A * | 7/1994 | Imamiya et al. | 152/527 |
| 5,411,071 A * | 5/1995 | Chapelle | 152/527 |
| 5,591,284 A | 1/1997 | Gaudin | |
| 5,616,195 A | 4/1997 | Marquet et al. | |
| 5,616,197 A * | 4/1997 | Helfer et al. | 152/527 |
| 5,653,829 A | 8/1997 | Gettys et al. | |
| 5,660,654 A * | 8/1997 | Miyazaki | 152/526 X |
| 5,662,751 A * | 9/1997 | Creech | 152/527 |
| 5,711,829 A | 1/1998 | Pollard et al. | |
| 5,738,740 A | 4/1998 | Cluzel | |
| 5,743,975 A | 4/1998 | Sinopoli et al. | |
| 5,996,662 A | 12/1999 | Cluzel | |
| 6,082,426 A | 7/2000 | Colom | |
| 6,131,633 A | 10/2000 | Slivka | |
| 6,343,637 B1 | 2/2002 | Slivka | |
| 6,401,778 B1 | 6/2002 | Cluzel | |

(Continued)

FOREIGN PATENT DOCUMENTS

EP 0573237 A1 12/1993

(Continued)

OTHER PUBLICATIONS

English translation of JP-10-58912 A.

(Continued)

*Primary Examiner*—Adrienne C. Johnstone
(74) *Attorney, Agent, or Firm*—Wood, Herron & Evans, L.L.P.

(57) ABSTRACT

Pneumatic tires for service on heavy vehicles having a belt package with widened belts. The tire includes a belt reinforcing structure or belt package having multiple cut belts of which one of the cut belts has a width approximately equal to the tire footprint. Widening two of the cut belts and forming at least one of the widened cut belts from a lighter material serves to improve tire durability in the regions of the tire crown and shoulder without increasing the overall tire weight.

2 Claims, 1 Drawing Sheet

U.S. PATENT DOCUMENTS 6,412,534 B1 * 7/2002 Kohno et al. ............... 152/527
6,659,147 B1 * 12/2003 Cordonnier ................ 152/526

FOREIGN PATENT DOCUMENTS

| | | |
|---|---|---|
| EP | 0 738 615 A2 * | 10/1996 |
| FR | 2285255 | 4/1976 |
| FR | 2730456 A1 | 8/1996 |
| FR | 2759945 A1 | 8/1998 |
| FR | 2 770 457 A1 * | 5/1999 |
| FR | 2770458 A1 | 5/1999 |
| GB | 1567614 | 5/1980 |
| GB | 2064445 A | 6/1981 |
| JP | 07101207 A * | 4/1995 |
| JP | 07164819 A * | 6/1995 |
| JP | 08085306 A * | 4/1996 |
| JP | 08118912 A * | 5/1996 |
| JP | 10-058912 A | 3/1998 |
| JP | 2002-178715 A | 6/2002 |
| JP | 2003-226112 A | 8/2003 |
| WO | WO99/06227 A1 | 2/1999 |

OTHER PUBLICATIONS

European Patent Office, Office Action Issued in Related European Patent Application No. 04 106 686.1-2425, dated Jun. 14, 2006.
English translation of JP 10-58912 A, Mar. 3, 1998.

* cited by examiner

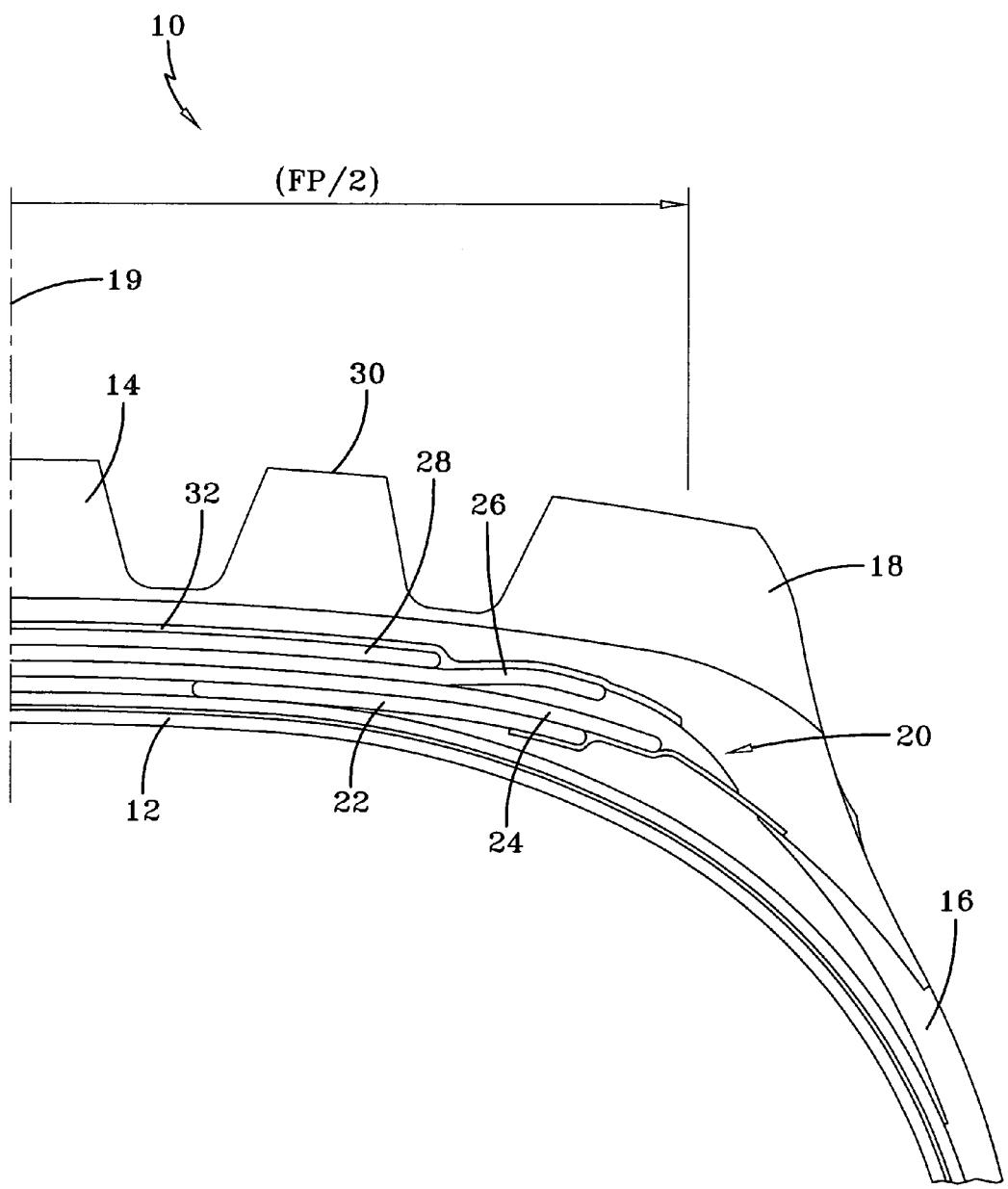

PNEUMATIC TIRE WITH IMPROVED CROWN DURABILITY

FIELD OF THE INVENTION

The present invention generally relates to pneumatic tires and, more specifically, to pneumatic tires for use on large commercial vehicles.

BACKGROUND OF THE INVENTION

Pneumatic tires for severe service applications on heavy vehicles that operate at slow speeds, such as refuse trucks, construction trucks, and tankers, are prone to significant heat buildup in the tire crown area. The heat buildup reduces both belt edge durability and crown durability. Conventional pneumatic tires incorporate a belt package that includes multiple cut belt layers wrapped about the circumference of the tire. Typically, the cut belt layers in conventional pneumatic tires for use on such heavy vehicles are formed from a single type of belt wire and are narrower in width than the tire footprint. Conventionally, the width of the widest cut belt layer is less than 90% of the tire footprint.

One specific type of pneumatic tire, the 11R24.5 G286 LR 'H' tire, for use in severe service applications is constructed with four individual cut belts each formed from a single type of belt wire. Two of the cut belt layers are deemed the working belt layers. The green widths of the working belt layers of the LR 'H' tire, which has a footprint width of 7.89", are 7.00" and 7.80", respectively, and the corresponding cured belt widths are 6.40" and 7.00", respectively. The cured belt widths are approximately 81% and 89% of the tire footprint, respectively. The contribution of the two working belts alone to the overall tire weight is 14.31 lbs. Individually, the weight contribution for one working belt is about 6.79 pounds and the weight contribution for the other working belt, which is the wider of the two working belts, is about 7.52 pounds.

For these and other reasons, it would be desirable to modify pneumatic tires for severe service applications on heavy vehicles so as to improve tire durability and stiffness without significantly increasing tire weight.

SUMMARY OF THE INVENTION

The invention is directed to pneumatic tires for heavy vehicle service that include a carcass, a tread disposed radially outward of the carcass, a sidewall intersecting the tread at a shoulder, and a belt reinforcing structure positioned radially between the carcass and the tread. The belt reinforcing structure includes two belt layers characterized by different weights per unit width. The width of one of the belt layers is approximately equal to the width of the tread footprint. The pneumatic tires of the invention containing the widened belt layer have an improved crown durability and stiffness achieved while maintaining the overall tire weight constant.

BRIEF DESCRIPTION OF THE DRAWINGS

The accompanying drawing, which is incorporated in and constitutes a part of this specification, illustrates an embodiment of the invention and, together with a general description of the invention given above, and the detailed description given below, serves to explain the invention.

The FIGURE is a cross-sectional view of a pneumatic tire in accordance with an embodiment of the invention.

DEFINITIONS

"Axial" and "axially" means the lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Carcass" means the tire structure apart from the belt structure, tread, undertread, and sidewall rubber over the plies, but including the beads.

"Cord" means one of the reinforcement strands of which the plies in the tire are comprised.

"Crown" refers to substantially the outer circumference of a tire where the tread is disposed.

"Circumferential" means circular lines or directions extending along the surface of the sidewall perpendicular to the axial direction.

"Cut belt or cut breaker reinforcing structure" means at least two cut layers of plies of parallel cords, woven or unwoven, underlying the tread, unanchored to the bead, and having both left and right cord angles in the range from 10 degrees to 33 degrees with respect to the equatorial plane of the tire.

"Equatorial plane (EP)" means the plane perpendicular to the tire's axis of rotation and passing through the center of its tread.

"Footprint" means the contact patch or area of contact of the tire tread with a flat surface at zero speed and under normal load and pressure.

"Inner" means toward the inside of the tire.

"Lateral" means a direction parallel to the axial direction, as in across the width of the tread or crown region.

"Outer" means toward the tire's exterior.

"Pneumatic tire" means a laminated mechanical device of generally toroidal shape, usually an open-torus having beads and a tread and made of rubber, chemicals, fabric and steel or other materials.

"Radial" and "radially" mean directions radially toward or away from the axis of rotation of the tire.

"Shoulder" means the upper portion of sidewall just below the tread edge.

"Sidewall" means that portion of a tire between the tread and the bead area.

"Tread" means a molded rubber component which, when bonded to a tire casing, includes that portion of the tire that comes into contact with the road when the tire is normally inflated and under normal load.

DETAILED DESCRIPTION

With reference to the FIGURE, a pneumatic tire 10 includes a carcass 12, a ground-engaging tread 14, a sidewall 16, and a shoulder 18 defined at the juncture between the sidewall 16 and the tread 14. When mounted on a vehicle, the tread 14 furnishes traction and tire 10 contains a fluid that supports the vehicle load. Pneumatic tire 10 is understood to have mirror symmetry for reflection about an equatorial plane 19 bisecting tire 10 so that the following description is understood to apply to the full tire width. Pneumatic tire 10 has a footprint (FP), as described hereinabove.

Arranged radially between the carcass 12 and the tread 14 is a belt package, generally indicated by reference numeral 20, that includes a plurality of, for example, four individual cut belt plies or layers 22, 24, 26, and 28. The cut belt layers 22, 24, 26, and 28 are formed of polyester, nylon or aramid cord or monofilament steel cord reinforcement encased inside a corresponding elastomer coating. The cut belt layers 22, 24, 26, and 28 reinforce a crown 30 of the tire 10 and are applied to the tire 10 as individual spliced sheets of cord reinforcement. A tread cushion 32 is provided radially outward of the cut belt layers 22, 24, 26, and 28 for joining the tread 14 with the belt package 20. In the tire making process, the green carcass 12, tread 14, sidewalls 16 and belt package 20 are united and then mounted in a curing mold for vulcanizing the tire 10.

In accordance with the invention, the widths of cut belt layers 24 and 26 are increased as compared with conventional tires for service on heavy vehicles. Cut belt layer 24 is the wider of the two cut belt layers 24, 26. More specifically, the cured width of cut belt layer 24 is approximately equal to the width of the footprint of tire 10 to within ±1% and the cured width of cut belt layer 26 is greater than or equal to about 90% of the width of the footprint. The tire footprint becomes slightly more rounded near the shoulder 18, which would reduce the pressure in the shoulder 18 for improving crown stiffness and durability as compared with conventional tires for service on heavy vehicles. The widths referenced herein refer to dimensions measured in the lateral or axial direction.

After the relative widths of the two types of belt wire are selected, the overall weight contribution of the cut belt layers 24 and 26 to the tire weight is either maintained constant or marginally reduced to a lesser weight, despite the increase in width, by appropriate selection of the type of belt material from which layers 24, 26 are constructed. Specifically, one of the cut belt layers 24 and 26 is constituted by a first type of belt wire and the other of the cut belt layers 24 and 26 is formed from a second type of belt wire that has a heavier weight per unit width than the first type of belt wire. The relative weight per lengths of the two types of belt wire assigned to the cut belt layers 24, 26 is determined by the desired overall weight contribution to tire 10 and the individual widths.

In one specific embodiment of the invention encompassing a pneumatic tire 10 having an 11R24.5 LR 'H' construction, tire 10 is characterized by a footprint width of 7.89 inches, a total weight of 144.5 pounds, and a tire wire gauge of 43.9 inches. Cut belt layer 26 of the LR 'H' tire 10 is formed of a first belt wire, which is wound at nine ends or wires per inch and has a wire gauge of 0.0555 inches, and has a width of 7.20" (7.80" in the green state), which contributes 7.52 pounds to the full tire weight. Cut belt layer 24 of the LR 'H' tire 10 is formed of a second belt wire, which is wound with fourteen ends or wires per inch and has a wire gauge of 0.0429 inches, and has a width of 7.80" (8.60" in the green state), which contributes 6.57 pounds to the full tire weight. The total weight contribution of cut belt layers 24, 26 to the full tire weight in this specific embodiment, which is equal to the sum of the individual contributions, is 14.09 pounds.

In an alternative specific embodiment of the invention in which tire 10 has an 11R24.5 LR 'H' construction, cut belt layer 26 of the LR 'H' tire 10 is formed of the second belt wire and has a cured width of 7.20" (7.80" in the green state), which contributes 5.96 pounds to the tire weight. Cut belt layer 24 of the LR 'H' tire 10 is formed of the first belt wire and has a cured width of 7.80" (8.60" in the green state), which contributes 8.34 pounds. The total weight contribution of the cut belt layers 24, 26 to the full tire weight in this alternative specific embodiment, which is equal to the sum of the individual contributions, is 14.30 pounds.

Consistent with the principles of the invention, the respective widths of the cut belt layers 24 and 26 of the LR 'H' tire 10 in these specific embodiments are increased and, by adjusting the type of belt material, the overall weight contribution of the belts 24 and 26 to the tire weight is either maintained constant or marginally reduced to a lesser weight contribution from the two specific cut belt layers. Due to the different constructions, the first type of belt wire of cut belt layer 24 is approximately 1.26 times heavier than the second type of belt wire of cut belt layer 26. In an absolute comparison, the first type of belt wire has a weight per unit width of 1.04 pounds per inch and the second type of belt wire has a weight per unit width of 0.84 pounds per inch.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A pneumatic tire for heavy vehicle service, comprising:
   a carcass;
   a tread disposed radially outward of said carcass and including a footprint width of 7.89 inches;
   a sidewall intersecting said tread at a shoulder; and
   a belt reinforcing structure positioned radially between said carcass and said tread, said belt reinforcing structure including a first belt layer and a second belt layer arranged radially outward from said first belt, said first belt layer having a first cured width of 7.80 inches, said second belt layer having a second cured width of 7.20 inches, and said second belt layer having a greater weight per unit width than said first belt layer, said first belt layer including a plurality of first monofilament steel cords with a first wire gauge, and said second belt layer including a plurality of second monofilament steel cords of a second wire gauge different than said first wire gauge;
   wherein said first belt is formed from material having fourteen ends per inch and said first monofilament steel cords have a wire gauge of 0.0429 inches;
   wherein said second belt is formed from material having nine ends per inch and said second monofilament steel cords have a wire gauge of 0.0555 inches.

2. The pneumatic tire of claim 1 wherein said first belt layer is characterized by a weight per unit width of 0.84 pounds per inch and said second belt layer is characterized by a weight per unit width of 1.04 pounds per inch.

* * * * *